United States Patent [19]

Cornils et al.

[11] Patent Number: 5,336,349
[45] Date of Patent: Aug. 9, 1994

[54] PROCESS AND DEVICE FOR THE PRODUCTION OF AN ARTICLE EQUIPPED WITH A PROFILED BEAD

[75] Inventors: Gerd Cornils, Merzenich-Girbelsrath; Heinz Kunert, Köln, both of Fed. Rep. of Germany

[73] Assignee: Saint Gobain Vitrage International, Courbevoie, France

[21] Appl. No.: 916,325

[22] Filed: Jul. 17, 1992

[30] Foreign Application Priority Data

Jul. 17, 1991 [DE] Fed. Rep. of Germany ....... 4123588

[51] Int. Cl.⁵ ............................................. B29C 47/12
[52] U.S. Cl. ................................... 156/107; 156/108; 156/244.11; 156/500; 156/546; 156/575; 118/323; 118/696; 118/697; 118/706; 118/DIG. 2; 425/458; 425/465; 425/466
[58] Field of Search .................. 156/107, 108, 244.11, 156/500, 546, 575; 425/458, 465, 466; 118/323, 696, 697, 706, DIG. 2

[56] References Cited

U.S. PATENT DOCUMENTS

| | | |
|---|---|---|
| 3,416,833 | 12/1968 | Griffin . |
| 3,742,649 | 7/1973 | Dochnahl . |
| 4,139,234 | 2/1979 | Morgan ................. 296/84 |
| 4,438,609 | 3/1984 | Nielson et al. . |
| 4,530,192 | 7/1985 | Ginster . |
| 4,581,276 | 4/1986 | Kunert et al. ............ 156/108 |
| 4,753,824 | 6/1988 | Toda et al. .............. 118/697 |
| 4,768,319 | 9/1988 | Derner . |
| 4,933,032 | 6/1990 | Kunert ................. 156/244.25 |
| 4,938,521 | 7/1990 | Kunert . |
| 4,970,102 | 11/1990 | Guillon . |
| 5,033,249 | 7/1991 | Scheeren et al. ............ 156/107 |
| 5,057,265 | 10/1991 | Kunert et al. ............ 264/511 |
| 5,062,248 | 11/1991 | Kunert . |
| 5,069,012 | 12/1991 | Riederer . |
| 5,085,021 | 2/1992 | Kunert . |
| 5,095,669 | 3/1992 | Kunert et al. . |
| 5,096,255 | 3/1992 | Leischner . |
| 5,108,526 | 4/1992 | Cornils et al. ............ 156/244.11 |
| 5,137,323 | 8/1992 | Gross et al. . |
| 5,154,028 | 10/1992 | Hill et al. . |

FOREIGN PATENT DOCUMENTS

| | | |
|---|---|---|
| 0076924 | 4/1983 | European Pat. Off. . |
| 0083061 | 6/1983 | European Pat. Off. . |
| 0304694A2 | 3/1989 | European Pat. Off. ........ B60J 1/10 |
| 0421833 | 10/1991 | European Pat. Off. . |
| 2308457 | 2/1973 | Fed. Rep. of Germany . |
| 3323006A1 | 6/1983 | Fed. Rep. of Germany ... B60J 1/02 |
| 3419894A1 | 5/1984 | Fed. Rep. of Germany .......... C03C 27/04 |
| 1591317 | 6/1981 | United Kingdom . |
| 2132130A | 7/1984 | United Kingdom ........... B29H 9/10 |

OTHER PUBLICATIONS

Application patent Ser. No. 07/953,438.
Application patent Ser. No. 08/125,902.
Japanese Patent Office, Patent Abstracts Of Japan, 8 Juin 1990, vol. 14, No. 266 (M-982) (4209); JP-A-20 76 16 (Toyoda Gosei Co. Ltd.) 16 Mars 1990.
Derwent Publications Ltd., London, GB; AN 90-128279 [17]; JP-A-2 076 716 (Toyoda Gosei) 16 Mars 1990.

*Primary Examiner*—Caleb Weston
*Attorney, Agent, or Firm*—Pennie & Edmonds

[57] ABSTRACT

The method of and apparatus for equipping a surface of an article with a profiled gasket, bead or a profiled frame, after appropriate pretreatment of the surface. A thermoplastic elastomer is supplied via an extruder and a heated pressure hose to a heated extrusion nozzle. The nozzle is guided by a robot, and the elastomer is extruded and laid by means of the extrusion nozzle onto the surface. The gasket is applied, for example, to an automobile glazing as a profiled frame along its border.

12 Claims, 3 Drawing Sheets

PROCESS AND DEVICE FOR THE PRODUCTION OF AN ARTICLE EQUIPPED WITH A PROFILED BEAD

FIELD OF THE INVENTION

This invention relates to a process for the production of a prefabricated article with a profiled bead of a polymer, bonded to the article and for example for the production of a prefabricated automobile glazing made of monolithic, laminated or innerly plastic sheeted glazing having around its border a profiled frame. The invention furthermore relates to a device for carrying out this process.

Background Of The Invention

It is known to produce articles such as automobile windows having a profiled bead, for instance a sealing and possibly holding frame, from a polymer as a prefabricated unit in that the article is laid as a core plate such as a windshield in the mould of an injection moulding machine for the frame profile and the profiled frame is injection moulded directly onto the edge of the pane (U.S. Pat. No. 4,139,234, EP 0 076 924). For the forming of the frame, either reaction systems, especially two-component polyurethane systems, or thermoplastics materials, such as PVC or also rubber, may be used. When rubber is used, the profiled frame must afterwards be vulcanized either in the injection mould itself or in a separate operation. This known injection moulding process is very expensive, because a separate injection mould must be prepared for each pattern of glass pane.

It is furthermore known to produce glass panes provided with a frame of an elastomer by extruding and laying a profiled strand of a reacting polymer system directly onto the edge of the glass pane by means of a calibrated nozzle guided by an automatic handling device, where the polymer material adheres firmly on the glass pane and hardens to an elastic polymer (U.S. Pat. No. 5,057,265). As reaction systems, moisture-hardening, single-component polyurethane prepolymers and polyurethane systems on a two-component basis, in each case in pasty form, have proved satisfactory, it being necessary for suitable bond promoting coatings to be applied first onto the glass surface. With this known process, glass panes of a very wide variety of shapes can be provided in a particularly economical manner with a frame or with frame components, because no conversion of the manufacturing installation is necessary but instead, at each change of the glass pane model, only the displacement programme of the automatic handling device needs to be modified. In this known process, however, on account of the system-imposed reaction times of the polymer systems, fairly costly hardening ranges or sections for the extruded frames must be provided in a production line. By comparison with the injection moulding process, a drawback of this process is that the seam location between the start and the end of the extruded profiled strand must afterwards be finished in an additional process step. The plastics materials known and used hitherto for this process are, furthermore, not reusable, which does present problems in respect of disposal of the materials.

SUMMARY OF THE PRESENT INVENTION

The objective of the present invention is to provide a process for pre-equipping different articles such as glass panes with a bead of a polymer, wherein, while benefitting from the advantages of the known extrusion process, the time up to the solidification of the profiled bead is shortened and the finishing process for the seam is simplified.

The present invention consists of supplying a thermoplastic elastomer to the surface of the article where it is to be applied, after appropriate pretreatment of the surfaces. The thermoplastic elastomer is supplied to a heated extrusion nozzle via an extruder and a heated pressure hose. The nozzle is guided by an automatic handling device, and the elastomer is extruded and applied by means of the extrusion nozzle on the surface of the article.

The process according to this invention possesses, compared to the known extrusion of a reactive polymer system, a number of decisive advantages. Thus, for example, the hardening phase of the extruded profile is completely eliminated, because the thermoplastic elastomer solidifies by cooling immediately after it is applied or laid on the surface of the article. This leads to a considerable shortening and simplification of the process. Furthermore, in case of article with full frames, the after-finishing of the seam between the start and the end of the extruded profile strand is made considerably simpler than in the known process. This is so because the transition zone can be reshaped at any time with simple after-pressing tools, and this reshaping or finishing operation can be repeated several times if necessary. Furthermore, the known difficulties that are associated with the fact that reaction systems react and harden inside the extrusion tools and nozzle opening also disappear. Special measures for cleaning the extrusion tools no longer need to be performed in the process according to this invention, because the polymer material that hardens in the extrusion tools can be brought back into its plastic, extrudable condition at any time by simply heating it. Finally, a very special advantage is the feature that not only can waste materials from the thermoplastic elastomer be reused, but that, also, when products comprising such equipped articles are later scrapped, the recovery and reuse of the thermoplastic elastomer can be carried out without particular difficulties.

For the method according to this invention, usual screw extruders may be used, which heat the thermoplastic material to the necessary processing temperature by external cylinder heaters. The melted elastomer is supplied to the extrusion nozzle via a flexible hose, also provided with a suitable heater, which hose must be capable of resisting the high pressures corresponding to the viscosity of the thermoplastic elastomer. The extrusion nozzle is also heated by means of a suitable heater to the necessary processing temperature of the elastomer and is guided by means of a robot along the edge of the article.

For the purpose of this invention, thermoplastic elastomers based upon polyurethane may, for example, be used. Especially suitable also, however, have proved to be thermoplastic polyurethane elastomers of isotactic polypropylene and ethylene-propylene-diene rubber, for example the products SANTOPRENE of the Monsanto Company, especially the product SANTOPRENE A type 111-64. Thermoplastic rubbers of this type have a processing temperature of 180° to 230° Celsius, so that not only the extruder but also the hose leading to the extrusion nozzle and the extrusion nozzle itself must be regulated to this temperature range.

In order to ensure the necessary high bond to the bare or treated article surface, for instance to the coating of enamel present on the glass pane, in a further embodiment of this invention, the surface is treated with a suitable bond promoting system in the edge region to be coated. Modified polyurethane systems in chlorinated solvents in particular have proved to be suitable bond promoting systems for glass surfaces.

DETAILED DESCRIPTION OF THE INVENTION

The glass pane 1, which is to be provided along its edge with a profiled frame of a thermoplastic elastomer may be, for example, an automobile glazing made of a monolithic, laminated or an innerly plastic heated glass pane. The pane is provided at the edge of that surface upon which the profiled strand is to be extruded and laid, with a frame-like coating 2 of an opaque baking finish, which for example is baked in during the course of the glass pane curving or bending process. The surface of this coating 2 is first carefully cleaned and pretreated with a bond-promoting agent. A suitable bond-promoting agent is a modified two-component polyurethane system in a solvent, which consists of a mixture of trichloroethylene, 1,1,1-trichloroethane and methylene chloride; the product X 8310 of the firm HENKEL and the product AK 290 of the firm KÖMMERLING have, for example, proved particularly suitable.

The thus pretreated glass pane is then carefully positioned in the working region of a robot 4 on a table 5.

Figure 1:
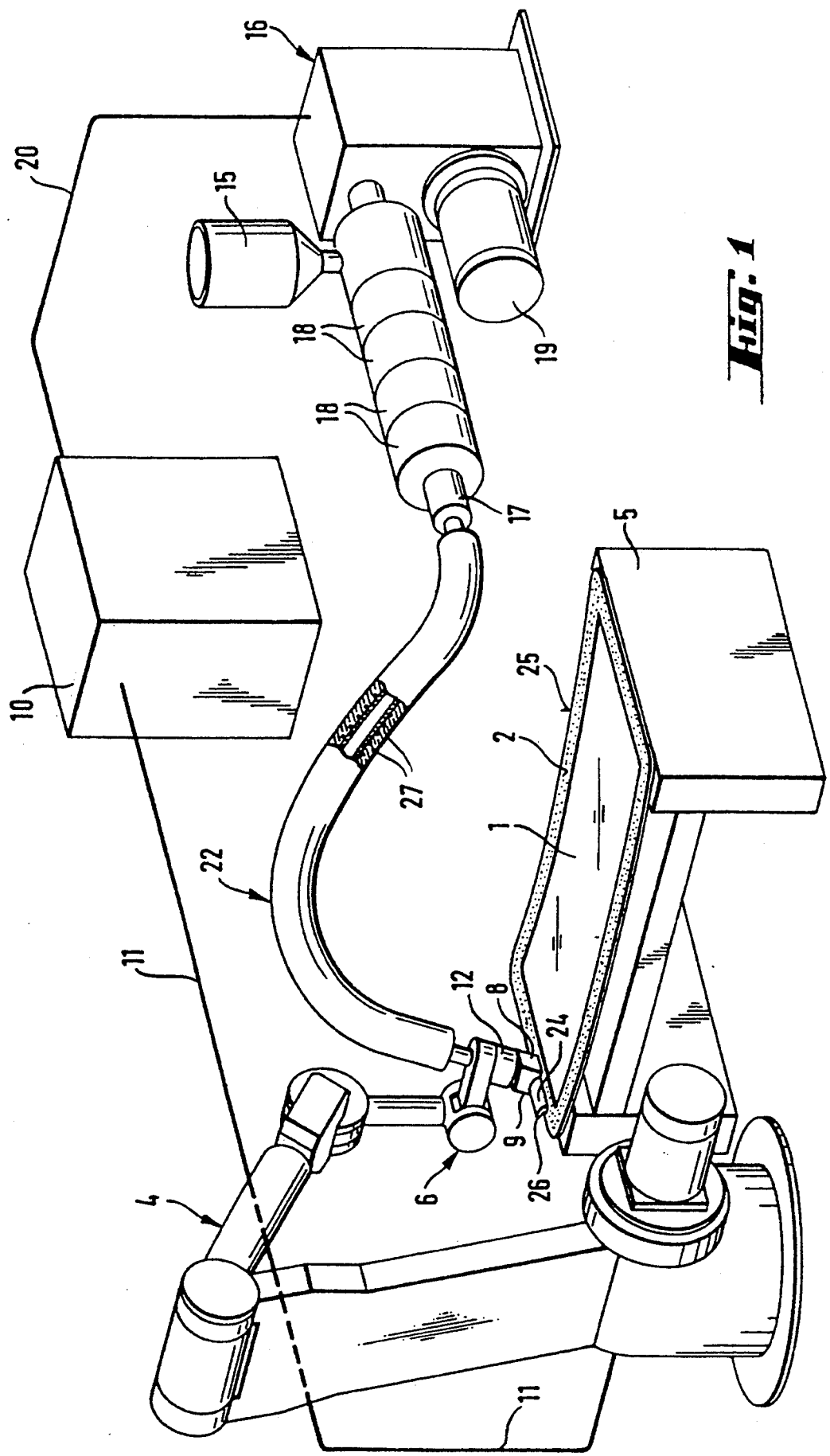
FIG. 1 is a perspective view of an installation suitable for carrying out the process according to this invention.
Figure 2:
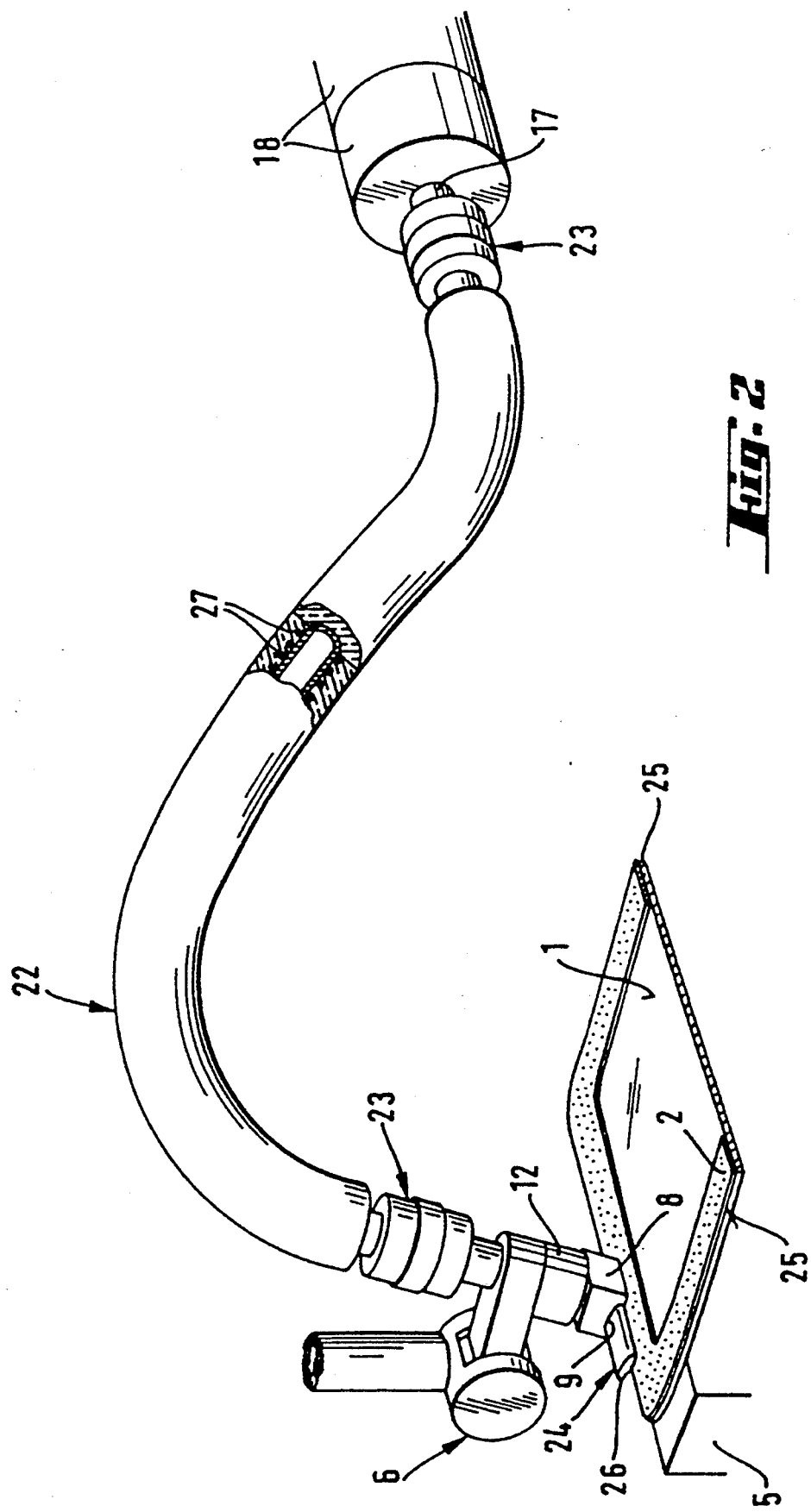
FIG. 2 is a detail view of FIG. 1 to a larger scale.

On the manipulation head 6 of the robot 4, an extrusion nozzle 8 is mounted. The nozzle is provided with a calibrated nozzle opening 9 corresponding to the cross-section of the desired frame profile (FIG. 2).

The extrusion nozzle 8 is guided by the robot 4 in accordance with the predetermined displacement programme along the edge of the glass pane 1, the robot 4 being controlled from a central control unit 10 via the control line 11. The extrusion nozzle 8 is provided with an electrical heating element 12, by which the nozzle body is heated to the temperature, about 200° Celsius, necessary for the extrusion of the thermoplastic elastomer.

The thermoplastic elastomer to be extruded is introduced in the form of granulate into the feed hopper 15 of the screw extruder 16 and is melted in the screw extruder 16 and supplied under high pressure to the extrusion nozzle 8. The cylinder 17 of the screw extruder 16, containing the screw, is surrounded by a plurality of heating rings 18. These rings heat the cylinder 17, and the screw revolving therein, to the required temperature by means of electrical heating resistors. The drive motor 19 for the screw extruder 16 is controlled via a control line 20, as also is the robot 4, from the central control unit 10.

The connection between the cylinder 17 of the extruder 16 and the extrusion nozzle 8 is provided by an electrically heated high pressure hose 22. The high pressure hose 22 must withstand pressures of at least 250 bar at operating temperature. The hose has an electrical heating coil 27 which provides a regulated heating of the hose 22 to a temperature of about 200° Celsius. On the other hand, the high pressure hose 22 must be sufficiently flexible for it to be able to follow the movements of the extrusion nozzle 8 without restriction, and for it not to interfere with the movements of the robot.

The high pressure hose 22 does inevitably have a certain torsional stiffness by which, in certain circumstances, it can interfere with the extrusion operation. For example, during a circuit of the manipulation head 6 around the glass pane 1, the extrusion nozzle is rotated through 360°, and this torsional movement is transmitted to the hose 22. By this continual torsional loading, the hose 22 is harmed, which results in accelerated wear of the hose 22. Also, the corresponding reaction forces are transmitted by these torsional forces into the manipulating head 6. This can lead to inaccuracy in the extrusion operation. To avoid these effects, one or more pipe swivel joints 23 can be incorporated as shown in FIG. 2 along the high pressure hose 22. With advantage, a first pipe swivel joint 23 is disposed immediately adjacent to the manipulation head 6, while a second pipe swivel joint 23 is disposed between the cylinder 17 of the extruder 16 and the high pressure hose 22. The pipe swivel joints must be designed for the requirements according to the particular thermoplastics used. For example, where the thermoplastic polyolefin elastomer of isotactic polypropylene and ethylene-propylene-diene rubber described here is used, these swivel joints must be temperature-resistant up to about 200° Celsius and pressure-resistant to about 500 bar. Furthermore, they must have the largest possible internal diameter, in order to avoid pressure losses.

Figure 3:
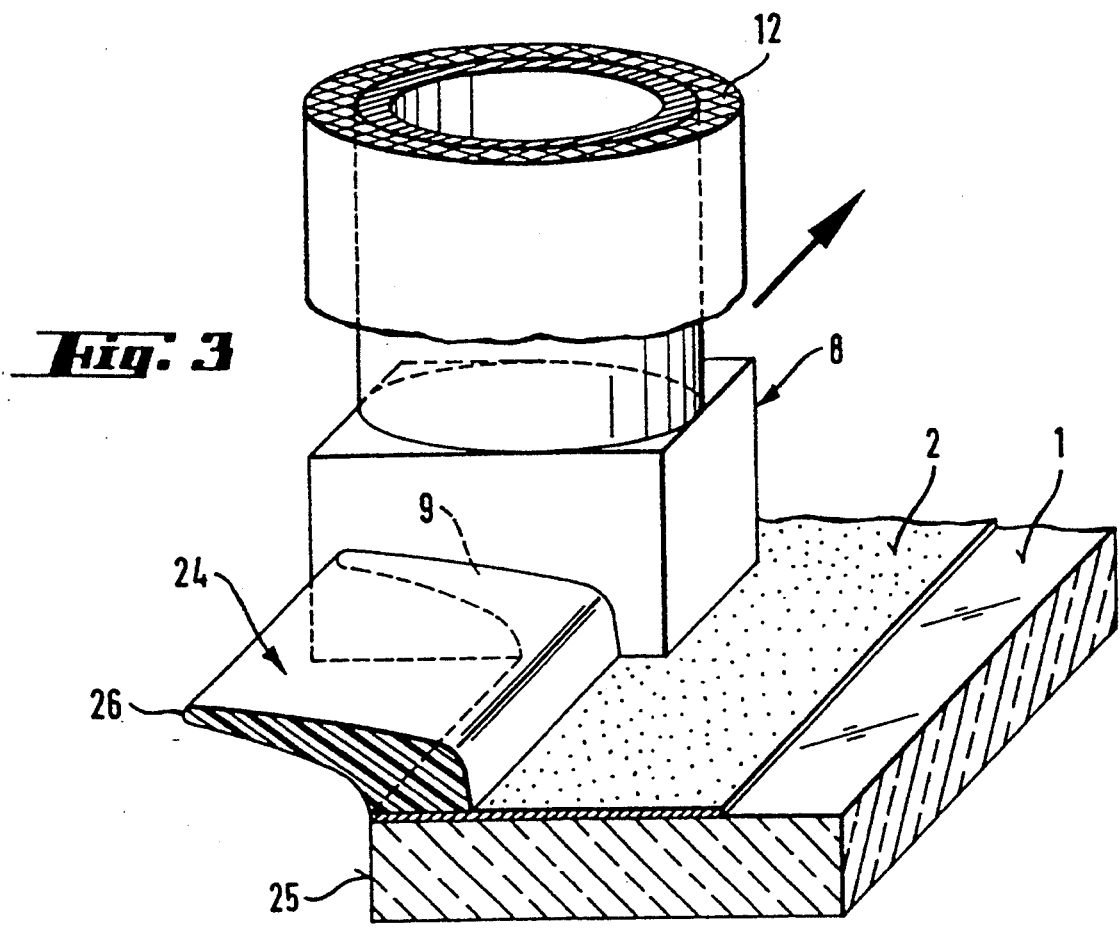
FIG. 3 is a detail view showing a heated extrusion head and its method of operation.

By means of this device, the product SANTO-PRENE A type 111-64 of the firm Monsanto is extruded and laid as a profiled strand 24 (FIG. 3), on the edge zone of the glass pane, pretreated with the bond promoter described. In the case illustrated here, the profiled strand 24 possesses a sealing and centering lip 26, projecting beyond the peripheral surface 25 of the glass pane 1. When the glass pane is placed in the window frame of the automobile body, this elastic lip 26 bends about the peripheral surface 25 of the glass pane 1 and thus ensures an automatic centering of the glass pane in the window opening. Furthermore, the lip 26 fills the gap between the peripheral face 25 of the glass pane 1 and the flange of the window frame, opposite this peripheral face 25. Instead of this lip 26, a hose-like hollow profile may be provided, which fulfills the same purpose.

Figure 4:
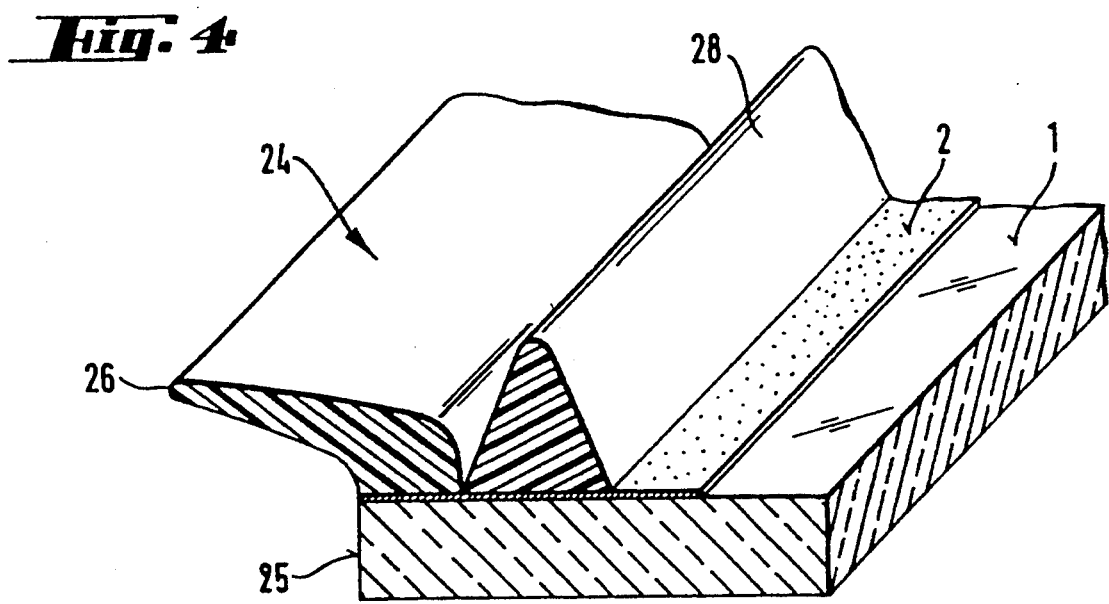
FIG. 4 is a detail view of part of an automobile glass pane ready for installation.

In order to fit the glass pane 1, pre-equipped with such a frame profile 24, into the window frame of the automobile body, an adhesive assembling bead 28 is applied onto the coating 2, as shown in FIG. 4, alongside the elastic frame profile 24. The bead is applied after suitable pretreatment of this coating with an appropriate cleaning liquid and a suitable bond promoting agent. The bead serves for bonding the glass pane 1 to the window frame of the automobile body.

The method and device which has been illustrated above in the case of an automobile glazing with a profiled frame may be used as well in each case where a profiled gasket or band is to be extruded directly onto the surface of any article and anywhere on this surface. They can find an application in the following industries:

Automobile industry: seals for doors, trunks, hoods or mobile roofs,

Household appliances: refrigerator doors, washing machine seals.

Building industry: prefabricated insulating glazing, door or window seals.

Industry in general: lid or cover seals, pipe gasket or casing seals,

Textile or clothing industry: clothing seals, reinforcing elastomer band, boot seals and so on.

In each case, depending on the nature of the substrate the use of a primer to guarantee a good adhesion might be necessary. It is up to the man skilled in the art to find out which primer is the most adequate to promote the adhesion of a given polymer on each substrate for instance plastic or painted material.

We claim:

1. Process for the production of a prefabricated article (1) and profiled bead of a polymer after suitable pretreatment of the surface of the article (1), firmly bonded to a surface of said article, comprising the steps of:
   a) supplying a thermoplastic elastomer by an extruder (16) and a heated pressure hose (22) to a heated extrusion nozzle (8);
   b) guiding said nozzle (8) along said surface by a displacement-controlled automatic handling device (4); and
   c) extruding and laying a bead of said polymer on the surface of the article (1) by means of the extrusion nozzle (8) after suitable pretreatment of the surface of the article (1).

2. Process according to claim 1, wherein:
   a) a thermoplastic polyolefin elastomer of isotactic polypropylene and ethylene-propylene-diene rubber is used as said thermoplastic elastomer.

3. Process according to claim 1 or 2, wherein:
   a) the article consists of an automobile glazing made of a monolithic, a laminated or an innerly plastic sheeted glass pane; and
   b) the profiled bead forms a frame or a frame component around said glazing.

4. Process according to claim 3, wherein:
   a) a modified polyurethane system in chlorinated solvents is used as bond promoting agent for the pretreatment of the glass surface.

5. Process according to claim 1 or 2, wherein:
   a) the article consists of the door or the window of a building; and
   b) the profiled bead is a seal.

6. Process according to claim 1 or 2, wherein:
   a) the article consists of doors or parts of household appliances; and
   b) the profiled bead is a seal.

7. An apparatus for the production of a prefabricated article and profiled bead of a polymer firmly bonded to a surface of said article comprising:
   a) an extruder (16) having a cylinder (17) for supplying a thermoplastic elastomer;
   b) an extrusion nozzle (8);
   c) an electrical heater (12) attached to said nozzle for heating it;
   d) an electrically heated pressure hose (22) connecting the cylinder of said extruder to said nozzle;
   e) a displacement-controlled automatic handling device (4) for guiding said nozzle along said surface to lay on extruded bead of said polymer on said surface; and
   f) a central control unit (10) for controlling said extruder and said handling device.

8. Device according to claim 7, further comprising:
   a) one or more pipe swivel joints (23) at the connection of the pressure hose to said nozzle and/or the cylinder of said extruder.

9. Process for the production of a prefabricated article (1) and profiled bead of a polymer being firmly bonded to a surface of said article, said process comprising the steps of:
   a) supplying a thermoplastic polyolefin elastomer of isotactic polypropylene and ethylene-propylene-diene rubber by an extruder (16) and a heated pressure hose (22) to a heated extrusion nozzle (8);
   b) guiding said nozzle (8) along said surface by a displacement-controlled automatic handling device (4); and
   c) extruding and laying a bead of said elastomer on the surface of the article (1) by means of the extrusion nozzle (8).

10. Process according to claim 9 wherein the thermoplastic polymer is applied to the substrate after suitable pretreatment of the surface of the article (1).

11. Process for the production of a prefabricated article (1) and profiled bead of a polymer after suitable pretreatment of the surface of the article (1), said bead being firmly bonded to a surface of said article, said process comprising the steps of:
   a) supplying a thermoplastic elastomer by an extruder (16) and a heated pressure hose (22) to a heated extrusion nozzle (8);
   b) guiding said nozzle (8) along said surface by a displacement-controlled automatic handling device (4); and
   c) extruding and laying a bead of said polymer on the surface of the article (1) by means of the extrusion nozzle (8) after suitable pretreatment of the surface of the article (1), wherein
   d) the article consists of an automobile glazing made of a monolithic, a laminated or an innerly plastic sheeted glass pane; and
   e) the profiled bead forms a frame or a frame component around said glazing.

12. Process according to claim 11, wherein:
   a) the profiled bead possesses a sealing and centering lip.

* * * * *